No. 818,919. PATENTED APR. 24, 1906.
G. D. SCHEIFFLER.
ROLLER BEARING.
APPLICATION FILED SEPT. 22, 1904.

Witnesses
Georgiana Chace
Edward R. Monroe

Inventor
George D. Scheiffler
By Luther V. Moulton
Attorney

UNITED STATES PATENT OFFICE.

GEORGE D. SCHEIFFLER, OF JACKSON, MICHIGAN, ASSIGNOR, BY MESNE ASSIGNMENTS, TO GEORGE A. McKEEL AND COMPANY, LIMITED, OF JACKSON, MICHIGAN, A CORPORATION OF MICHIGAN.

ROLLER-BEARING.

No. 818,919.   Specification of Letters Patent.   Patented April 24, 1906.

Application filed September 22, 1904. Serial No. 225,442.

*To all whom it may concern:*

Be it known that I, GEORGE D. SCHEIFFLER, a citizen of the United States, residing at Jackson, in the county of Jackson and State of Michigan, have invented certain new and useful Improvements in Roller-Bearings; and I do hereby declare the following to be a full, clear, and exact description of the invention, such as will enable others skilled in the art to which it appertains to make and use the same.

My invention relates to improvements in roller-bearings; and its object is to arrange a series of rollers in a circle equidistant apart and to journal the ends of the rollers in separate rings, which are adjustably connected by flexible tie-rods or links to form a flexible cage as distinguished from a rigid frame or cage. It has been found that a rigid cage when used with a shaft that does not run quite true is subjected to a severe strain on account of the irregularity of the surface of the shaft, which tends to crystallize and break the cage. Such cages are thus frequently broken under such conditions.

I have found that by the use of a flexible cage that will yield and conform to any slight irregularity of the movement of the surface of the shaft the rollers will be automatically adjusted parallel to the shaft and will more readily conform to inequalities in the alinement of such shaft without liability of cutting the bearing-surfaces.

My invention consists, essentially, of a series of rolls provided with conical ends and adapted to surround the shaft, a suitable cylindrical casing or box, rings engaging the conical ends of the rolls and spacing the same apart at regular intervals, and flexible rods connecting the rings and adapted to hold the same in engagement with the ends of the rolls, as hereinafter more fully described, reference being had to the accompanying drawings, in which—

Figure 1:
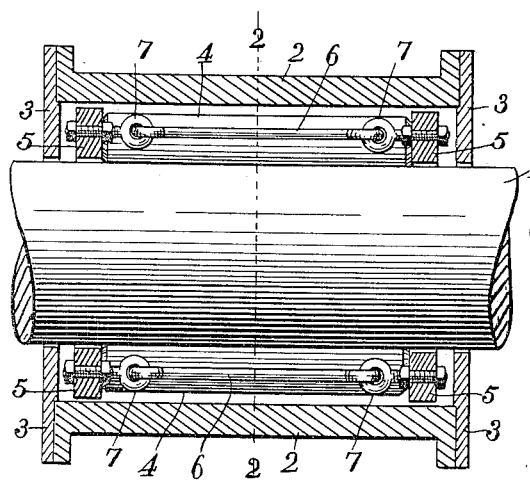
Figure 2:
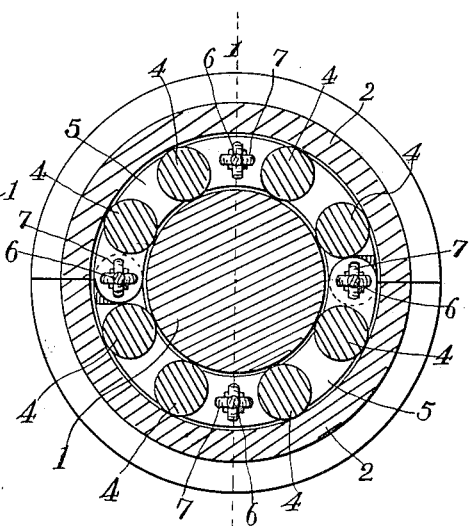
Figure 3:
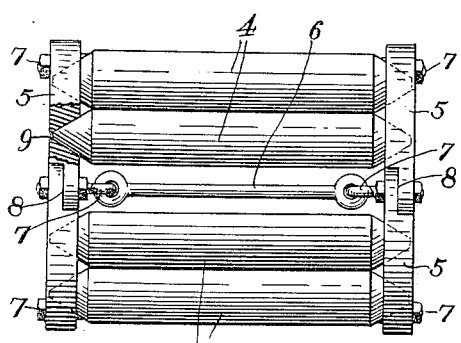
Figure 4:
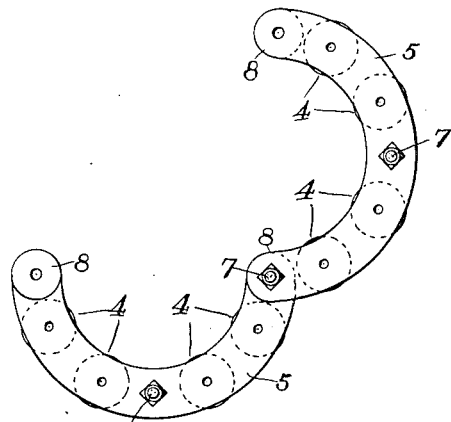
Figure 5:
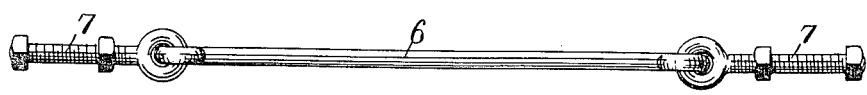

Figure 1 is a longitudinal section of a device embodying my invention; Fig. 2, a transverse section of the same; Fig. 3, a detail in side elevation of the rolls and flexible cage assembled; Fig. 4, an end elevation of the cage opened to permit the same to be placed on the shaft, and Fig. 5 an enlarged detail of one of the flexible connecting-rods.

Like numerals refer to like parts in all of the figures.

1 represents the shaft; 2, a suitable cylindrical box surrounding the shaft and of sufficient internal diameter to permit insertion of a series of rolls between the shaft and the interior of the box; 3, annular heads to the box; 4, a series of rolls having a diameter equal to the space between the box and shaft and having conical ends inserted in suitable conical bearings in the opposing surfaces of the rings 5. Opposite the axis of each roll are oil-openings 9, extending through the rings to admit oil to the conical ends of the rolls. The rings are also divided at opposite sides, as at 8, and connected by suitable bolts, preferably by the eyebolts forming part of the connecting means. The rings can thus be opened to place the same upon the shaft. These rings are flexibly connected to each other and adjustably spaced apart to compensate for the wear of the rolls and bearings in the rings by means of eyebolts 7, inserted in the rings and provided with nuts at each side of the rings and connected by rods 6, flexibly connected to the eyebolts, whereby the rings are adjustably spaced apart by adjusting the nuts on the eyebolts. The rings are thus free to independently rotate about the shaft to a slight extent and also to move out of axial alinement to a limited extent, whereby the rolls will be freely adapted to any irregularity in the surface of the shaft without straining the cage. I have found in practice that the tendency of this structure is to normally maintain the rolls in proper alinement with the axis of the shaft and the rings in axial alinement with each other, and at the same time the rolls will conform to any slight variation in the surface of the shaft from a true cylinder or true alinement with its axis without any injury to the cage and without any binding of the rolls in the case 2.

Having thus fully described my invention, what I claim, and desire to secure by Letters Patent, is—

1. In a roller-bearing, a series of rolls having conical ends, rings having conical bearings for said ends, and rods flexibly connecting the rings.

2. In a roller-bearing, a series of rolls having conical ends, rings having conical bearings for said ends, eyebolts in the rings and connecting-rods flexibly connected to said eyebolts.

3. In a roller-bearing, a series of rolls having conical ends, a case surrounding the rolls, rings having conical bearings for the rolls and divided at opposite sides, longitudinally-adjustable eyebolts in the rings, and connecting-rods flexibly connected to the eyebolts.

4. In a roller-bearing, a series of rolls, a case surrounding the rolls, rings having bearings for the rolls, eyebolts extending through said rings, nuts carried by said eyebolts and adapted to abut the inner and outer surfaces of the rings and connecting-rods flexibly connected to said eyebolts, said rings, the eyebolts and the connecting-rods constituting a flexible cage, substantially as described.

In testimony whereof I affix my signature in presence of two witnesses.

GEORGE D. SCHEIFFLER.

Witnesses:
    FORREST C. BADGLEY,
    VERNE W. BADGLEY.